US012620541B2

(12) United States Patent
Leitl et al.

(10) Patent No.: US 12,620,541 B2
(45) Date of Patent: May 5, 2026

(54) INSULATING-MATERIAL HOUSING AND COMPACT CIRCUIT BREAKER

(71) Applicant: Siemens Aktiengesellschaft, Munich (DE)

(72) Inventors: Wolfgang Leitl, Wenzenbach (DE); Tobias Sturm, Wiesent (DE)

(73) Assignee: Siemens Aktiengesellschaft, Munich (DE)

( * ) Notice: Subject to any disclaimer, the term of this patent is extended or adjusted under 35 U.S.C. 154(b) by 316 days.

(21) Appl. No.: 18/264,614

(22) PCT Filed: Feb. 3, 2022

(86) PCT No.: PCT/EP2022/052610
§ 371 (c)(1),
(2) Date: Aug. 8, 2023

(87) PCT Pub. No.: WO2022/167538
PCT Pub. Date: Aug. 11, 2022

(65) Prior Publication Data
US 2024/0112873 A1 Apr. 4, 2024

(30) Foreign Application Priority Data
Feb. 8, 2021 (DE) ..................... 10 2021 201 159.4

(51) Int. Cl.
*H01H 71/02* (2006.01)
*H01H 71/40* (2006.01)

(52) U.S. Cl.
CPC ........ *H01H 71/0235* (2013.01); *H01H 71/40* (2013.01)

(58) Field of Classification Search
CPC . H01H 71/0235; H01H 71/40; H01H 71/0207
(Continued)

(56) References Cited

U.S. PATENT DOCUMENTS 4,527,027 A * 7/1985 Link .................... H01H 77/108 200/303
6,259,342 B1 * 7/2001 Malingowski ....... H01H 71/525 335/172
(Continued)

FOREIGN PATENT DOCUMENTS

DE 102013211539 A1 3/2014
DE 102015213375 A1 1/2017
(Continued)

*Primary Examiner* — Mohamad A Musleh
*Assistant Examiner* — Lisa N Homza
(74) *Attorney, Agent, or Firm* — Laurence A. Greenberg; Werner. H. Stemer; Ralph E. Locher

(57) ABSTRACT

An insulating-material housing has first and second current path region next to each other and each having a first receiving space for a short-circuit tripping apparatus, a second receiving space for a switching contact and a third receiving space for an arc-quenching apparatus. The two first receiving spaces are arranged in a front side and a respective narrow side of the housing. The two second receiving spaces are arranged centrally between the two first receiving spaces. The third receiving spaces are arranged between a fastening side of the housing and the respectively associated first receiving space. A fourth receiving space for an additional functional assembly is next to the first and/or third receiving space of the first current path region in a normal direction of the broad sides. The compact configuration allows the circuit breaker to be expanded by an additional functional assembly in the fourth receiving space.

9 Claims, 6 Drawing Sheets

(58) Field of Classification Search
USPC .......................................................... 335/202
See application file for complete search history.

(56) References Cited

U.S. PATENT DOCUMENTS

| | | | | |
|---|---|---|---|---|
| 6,323,748 | B1 * | 11/2001 | Malingowski ..... | H01H 71/0207 335/172 |
| 6,356,175 | B1 * | 3/2002 | DeGrazia ............. | H01H 9/0264 335/132 |
| 6,437,671 | B1 * | 8/2002 | Gula ...................... | H01H 71/08 439/810 |
| 7,268,651 | B2 | 9/2007 | Eckert et al. | |
| 2006/0214752 | A1 | 9/2006 | Eckert et al. | |
| 2007/0268097 | A1 * | 11/2007 | Elviro ................ | H01H 71/0207 335/6 |
| 2007/0268098 | A1 * | 11/2007 | Ghosh ................ | H01H 71/0207 335/6 |

FOREIGN PATENT DOCUMENTS

| | | | |
|---|---|---|---|
| DE | 102015217704 | A1 | 3/2017 |
| EP | 1473750 | A1 | 11/2004 |
| EP | 2026368 | B1 | 2/2016 |
| EP | 2980822 | A1 | 2/2016 |
| EP | 2685482 | B1 | 5/2017 |
| WO | WO 2020007659 | A1 | 1/2020 |

* cited by examiner

INSULATING-MATERIAL HOUSING AND COMPACT CIRCUIT BREAKER

FIELD AND BACKGROUND OF THE INVENTION

The invention relates to an insulating-material housing for a compact circuit breaker. The insulating-material housing has a front side, a fastening side, as well as narrow and wide sides that connect the front side to the fastening side, and is divided into a first and a second current path region which in the width direction are disposed next to one another and are configured to receive in each case one current path. Each of the two current path regions here has a first receptacle space which is provided and configured to receive a short-circuit tripping device of the circuit breaker; a second receptacle space which is provided and configured to receive a switching contact of the circuit breaker; as well as a third receptacle space which is provided and configured to receive an arc-quenching device of the circuit breaker. Furthermore, the invention relates to a compact circuit breaker having an insulating-material housing of this type, wherein disposed in the first current path region is a first current path which is able to be interrupted by a first switching contact which is disposed in the second receptacle space of the first current path region, and disposed in the second current path region is a second current path which is able to be interrupted by a second switching contact which is disposed in the second receptacle space of the second current path region.

Electromechanical protective switches, for example circuit switches, circuit breakers, earth leakage circuit breakers, as well as arc-protection switches or fire-protection switches serve for monitoring and safeguarding an electric circuit and are used in particular as switching and safeguarding elements in electrical power supply and distribution networks. For monitoring and securing the electric circuit, the circuit breaker is connected to an electrical line of the circuit to be monitored in an electrically conducting manner by way of two or a plurality of terminals so as to interrupt the electric current in the respective monitored line when required. To this end, the protective switch has at least one switching contact which can be opened when a predefined state arises, for example when a short-circuit or an earth leakage current is detected, so as to separate the monitored circuit from the electric grid. Protective switches of this type are also known as row-mounted devices in the low-voltage engineering sector.

Circuit breakers are specially designed for high currents. A circuit breaker which is also referred to as a miniature circuit breaker (MCB) in the electrical installation represents a so-called over-current protection and is used in particular in low-voltage networks. Circuit breakers and protective circuit breakers guarantee a reliable shut-down in the event of a short circuit and protect consumers and installations against overload, for example from damage to the electrical lines by excessive heating as a consequence of an excessively high electric current. Said circuit breakers are configured to automatically shut down a circuit to be monitored in the event of a short circuit or when an overload arises, and thus disconnect said circuit from the remaining line network. Circuit breakers and protective circuit breakers are therefore used in particular as switching and safety elements for monitoring and securing an electric circuit in electric power grids. Circuit breakers are in principle known from documents DE 10 2015 217 704 A1, EP 2 980 822 A1, DE 10 2015 213 375 A1, DE 10 2013 211 539 A1, or EP 2 685 482 B1.

A single-pole circuit breaker which usually has a width of one pitch unit (corresponding to approx. 18 mm) is typically used for interrupting a single phase line. Three-pole circuit breakers are used for three-phase connections (as an alternative to three single-pole switching apparatuses), which accordingly have a width of three pitch units (corresponding to approx. 54 mm). Each of the three phase conductors is assigned one pole, i.e. one switching point. If the neutral conductor is also to be interrupted in addition to the three phase conductors, reference is made to four-pole apparatuses which have four switching points: three for the three phase conductors, as well as one for the common neutral conductor. There are moreover compact circuit breakers which in a housing width of only one pitch unit provide two switching contacts, each for one connecting line, i.e. either for two phase lines (compact circuit breakers of the type 1+1) or for one phase line and the neutral conductor (compact circuit breakers of the type 1+N).

An earth leakage circuit breaker is a protective device for guaranteeing protection against a dangerous earth leakage current in an electrical installation. An earth leakage current of this type, which is also referred to as a differential current, arises when a voltage-conducting part of a line is in electrical contact with the ground. This is the case, for example, when a person touches a voltage-conducting part of an electrical installation: in this case, the current as an earth leakage current flows through the body of the respective person toward the ground. In order to protect against body currents of this type, the earth leakage circuit breaker must rapidly and reliably disconnect all poles of the electrical installation from the grid when an earth leakage current of this type arises. In everyday language, the terms FI circuit breaker (abbr. FI switch), differential circuit breaker (abbr. DI switch) or RCD (residual current protective device) are used synonymously instead of the term "earth leakage circuit breaker".

Arc fault or fire protection devices are used to detect fault arcs as may occur at a defective point of an electrical line—for example a loose cable clamp or on account of a cable breakage. If the fault arc occurs electrically in series with an electrical consumer, the normal operating current is generally not exceeded since it is limited by the consumer. For this reason, the fault arc is not detected by a conventional overcurrent protection device, for example a fuse or a line circuit breaker. In order to determine whether there is a fault arc, both the voltage profile and the current profile are measured over time by the arc fault detection device and are analyzed and evaluated in terms of the profiles characteristic of a fault arc. In the specialist literature, such protection devices for detecting fault arcs are referred to as arc fault detection devices, for short as AFDDs. In North America, the term "arc fault circuit interrupter" (or AFCI) is common.

11 In addition, there are also device types in which the functionality of a fault current circuit breaker is combined with the functionality of a line circuit breaker: such combined protective switching devices are referred to as RCBOs (for residual current operated circuit breaker with overcurrent protection). Compared with separate fault current circuit breakers and line circuit breakers, these combined devices have the advantage that each circuit has its own fault current circuit breaker: Normally, a single fault current circuit breaker is used for several circuits. If a fault current occurs, all the protected circuits are thus consequently deactivated. As a result of the use of RCBOs, only the circuit that is affected in each case is deactivated.

There is a tendency for ever more functionalities to be integrated into the devices, i.e. combined protective switching devices are being developed which cover the functional scope of several individual devices: in addition to the above-described RCBO protective switching devices, which combine the functional scope of a conventional earth leakage current circuit breaker (FI) with that of a line circuit breaker (LS), further designs exist in which, for example, the functionality of a fire-protection switch is integrated into existing devices such as MCBs, RCDs or RCBOs.

In particular in the case of compact circuit breakers, for example with two protected poles in one pitch unit or else with four protected poles in two pitch units, the available construction volume is highly restricted by the maximum possible external dimensions which are defined owing to the standardization, the required components and tripping units necessary for the individual device functions, as well as the required or resultant minimum wall thicknesses and cross sections of the individual parts and functional groups. In most instances, there is no additional construction volume available for potential additional functional upgrades of the protective switching device.

SUMMARY OF THE INVENTION

It is therefore the object of the present invention to provide an insulating-material housing for a compact circuit breaker, and a compact circuit breaker having a corresponding insulating-material housing, which are distinguished by an alternative arrangement of the individual components so that an additional functional group is able to be disposed in the insulating-material housing.

This object is achieved according to the invention by the insulating-material housing for a compact circuit breaker, and by the compact circuit breaker having a corresponding insulating-material housing, according to the independent claims. Advantageous design embodiments of the insulating-material housing according to the invention and of the compact circuit breaker according to the invention are the subject matter of the dependent claims.

The insulating-material housing according to the invention for a compact circuit breaker has a front side, a fastening side, as well as narrow and wide sides that connect the front side to the fastening side. Situated in the insulating-material housing are a first and a second current path region which in the width direction are disposed next to one another and are configured to receive in each case one current path, wherein each of the two current path regions has a first receptacle space which is provided and configured to receive a short-circuit tripping device of the circuit breaker; a second receptacle space which is provided and configured to receive a switching contact of the circuit breaker; as well as a third receptacle space which is provided and configured to receive an arc-quenching device of the circuit breaker. The two first receptacle spaces here are disposed in the region of the front side as well as in each case in the region of one of the narrow sides in the insulating-material housing, so that the two second receptacle spaces are disposed so as to be centric in the insulating-material housing, between the two first receptacle spaces. The third receptacle spaces here are in each case disposed between the fastening side and the respectively assigned first receptacle space of the respective current path region. A fourth receptacle space which is provided and configured to receive an additional functional group of the circuit breaker, in a normal direction of the wide sides is disposed next to the first and/or third receptacle space of the first current path region.

The term "compact circuit breaker" refers to a circuit breaker which has two protected poles per pitch unit, thus for example two protected poles in one pitch unit, or else four protected poles at a width of two pitch units, etc. Circuit breakers with three protected poles at a housing width of 1.5 pitch units are likewise included. One pitch unit corresponds to a housing width of approx. 18 mm.

The first and the second current path regions are disposed next to one another and run in each case from one of the two narrow sides to the other of the two narrow sides. The two current path regions are at least in portions mutually separated by a divider which likewise extends from one of the two narrow sides to the other of the two narrow sides and thus at least in portions runs parallel to the two wide sides. However, the divider here does not run centrically between the two wide sides but in portions is configured so as to project (in the direction of one of the two wide sides), so as to offer sufficient installation space to the components of the circuit breaker that are to be disposed in the respective receptacle spaces.

The spatial arrangement of the two first receptacle spaces is chosen in such a manner that the first receptacle space of the first current path region is disposed in the region of the one narrow side, but the first receptacle space of the second current path region is disposed in the region of the other narrow side, so that the two second receptacle spaces are able to be disposed between the two first receptacle spaces, so as to be centric in the insulating-material housing. This mutually opposite disposal of the two first receptacle spaces for receiving in each case one short-circuit tripping device, and the second receptacle spaces for receiving in each case one switching contact disposed therebetween, significantly contributes toward an extremely compact arrangement of the individual components in the insulating-material housing of the compact circuit breaker.

The third receptacle spaces assigned to the respective current path here are disposed in the region of the fastening side, below the first receptacle space assigned in each case to the respective current path, in the insulating-material housing, i.e. the third receptacle space of the first current path region in a normal direction of the front side is disposed behind the first receptacle space of this first current path region, while the third receptacle space of the second current path region in this exact normal direction is disposed behind the first receptacle space of the second current path region.

The disposal of the fourth receptacle space in a normal direction of the wide sides next to the first and/or third receptacle space of the first current path region is made possible in that the components to be disposed in the first and/or third receptacle space, i.e. of the respective short-circuit tripping device and/or of the respective arc-quenching device, are designed narrower in the width direction and therefore do not occupy the entire internal width of the insulating-material housing.

The compact design of these components, and the insulating-material housing, which is adapted exactly to this design, enable the fourth receptacle space to be provided, which is provided and configured to receive an additional functional group of the circuit breaker. Market-driven demand for increased integration of ever more functions in a device can thus also be met in the case of circuit breakers of a compact design.

In one advantageous refinement of the insulating-material housing, a further fourth receptacle space, which is provided and configured to receive a further additional functional group of the circuit breaker, in a normal direction of the wide sides is disposed next to the first and/or third receptacle space of the second current path region.

With the aid of the further fourth receptacle space, there is the possibility of integrating an additional function in the circuit breaker, which function can be implemented identically for both current paths and therefore requires additional installation space both in the first current path region as well as in the second current path region. Moreover, there is the possibility of implementing two different additional functional groups, for example sensor systems or integrated circuits, in the fourth receptacle space as well as in the further fourth receptacle space.

In a further advantageous refinement, the insulating-material housing is distinguished in that at least one of the fourth receptacle spaces extends at least partially from the region next to the first receptacle space to an adjacent region next to the third receptacle space.

In the event that the first receptacle space for receiving a short-circuit tripping device, as well as the third receptacle space assigned to the same current path region for receiving and an arc-quenching device, can be designed narrower than the maximum possible internal width of the insulating-material housing, there is the possibility that the fourth and/or the further fourth receptacle space are/is correspondingly enlarged and extends downward in the direction of the fastening side also into the region next to the third receptacle space, because the first and the fourth receptacle spaces of each current path region are disposed next to one another. In this way, a comparatively large additional functional group, for example a flat module, can be disposed in the fourth receptacle space.

In a further advantageous refinement of the insulating-material housing, the fourth receptacle space assigned to the respective current path region is disposed next to the first receptacle space of the same current path region.

Furthermore, in a further advantageous refinement of the insulating-material housing, the fourth receptacle space assigned to the respective current path region is disposed next to the first receptacle space of the other current path region.

The two refinements mentioned above relate to two alternative embodiments: In the first case, the fourth receptacle space, which is disposed next to the first and/or third receptacle space of the first current path region, is also assigned to this first current path region. This is particularly advantageous when the additional functional group to be disposed in the fourth receptacle space is to be assigned to the first short-circuit tripping device to be disposed in the first receptacle space of the first current path region, and/or to the first arc-quenching device to be disposed in the third receptacle space of the first current path region. The same applies to the further fourth receptacle space which in this instance is disposed in an analogous manner next to the first and/or third receptacle space of the second current path region and is assigned thereto.

In the second case, the fourth receptacle space, which is disposed next to the first and/or third receptacle space of the first current path region, is assigned to the other current path region, thus the second current path region. Accordingly, the further fourth receptacle space, which in this instance is disposed next to the first and/or third receptacle space of the second current path region, is assigned to the first current path region.

The compact circuit breaker according to the invention has an insulating-material housing of the type described above. A first current path which is disposed in the first current path region is able to be interrupted by a first switching contact which is disposed in the second receptacle space of the first current path region. A second current path which is disposed in the second current path region is able to be interrupted by a second switching contact which is disposed in the second receptacle space of the second current path region. Furthermore, the compact circuit breaker according to the invention has a first short-circuit tripping device which is disposed in the first receptacle space of the first current path region, a second short-circuit tripping device which is disposed in the first receptacle space of the second current path region, a first arc-quenching device which is disposed in the third receptacle space of the first current path region, a second arc-quenching device which is disposed in the third receptacle space of the second current path region, as well as an additional functional group which is disposed in the fourth receptacle space.

The compact circuit breaker according to the invention in terms of its topographical construction is based on the insulating-material housing according to the invention described above. In terms of the fundamental advantages of the compact circuit breaker according to the invention, reference is therefore made to the statements made above regarding the advantages of the insulating-material housing according to the invention.

In an advantageous refinement of the compact circuit breaker, the first switching contact and the second switching contact are disposed in an opposing manner and thus are activatable in an opposing manner.

The opposing disposal of the switching contacts enables a particularly compact disposal of the switching contacts between the first and the second short-circuit tripping device, and thus an extremely compact design of the compact circuit breaker.

In a further advantageous refinement of the compact circuit breaker, the additional functional group is assigned to the first and/or the second current path region.

In a further advantageous refinement of the compact circuit breaker, a further additional functional group is disposed in the further fourth receptacle space.

By means of the additional functional group, which may be assigned to the first or the second or else both current path regions, the user-driven demand for greater integration of additional functionalities in the individual protective switching devices is met also in terms of circuit breakers of compact design, having two protected poles in one pitch unit. The same applies to the integration of the further additional functional group in the insulating-material housing of the compact circuit breaker according to the invention.

Exemplary embodiments of the insulating-material housing according to the invention and of the compact circuit breaker according to the invention will be explained in more detail hereunder with reference to the appended figures. In the figures:

DETAILED DESCRIPTION OF THE INVENTION

Figure 1:
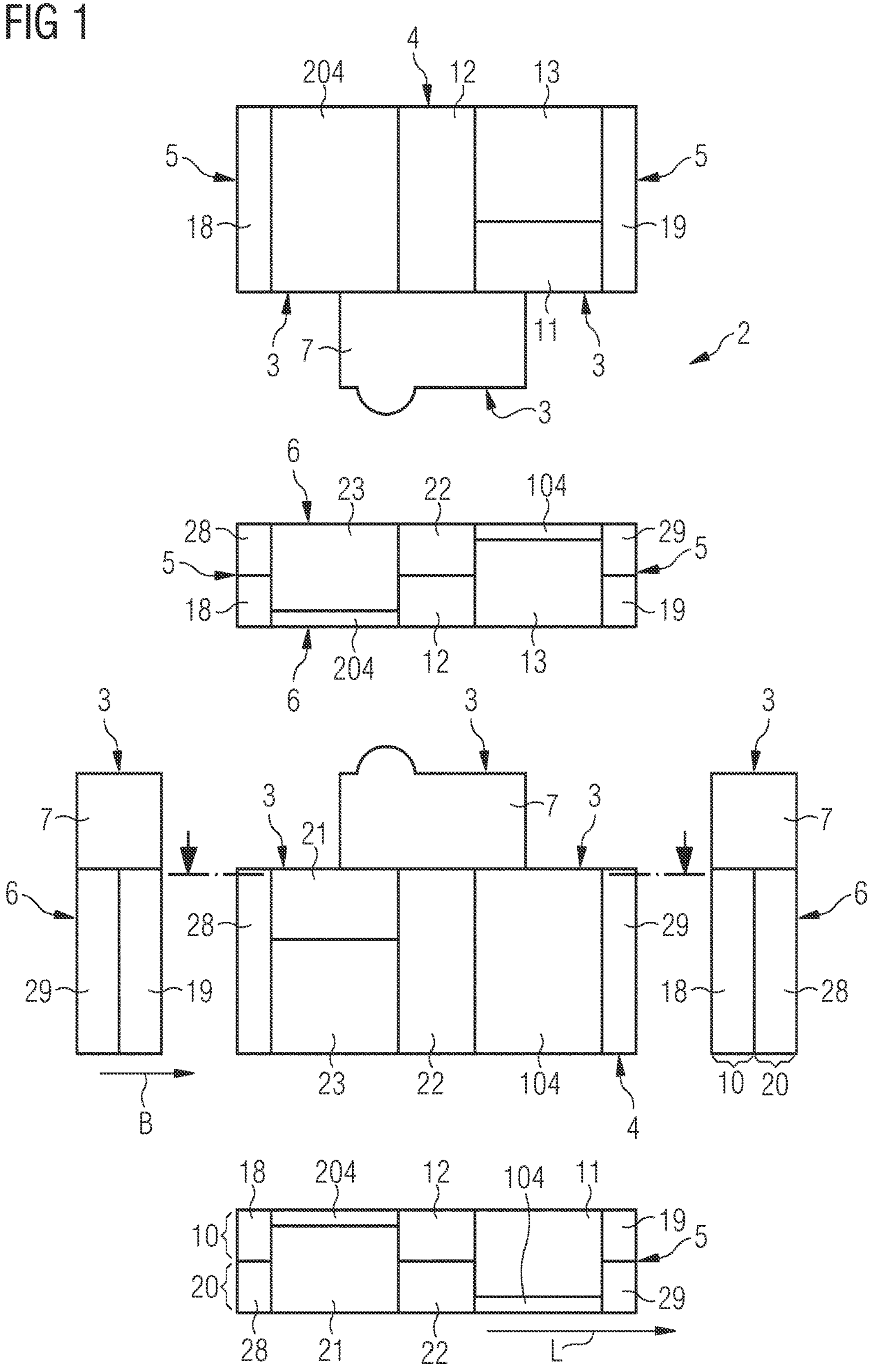
FIG. 1 shows a first exemplary embodiment of the insulating-material housing according to the invention in a plurality of views.

The same parts are at all times provided with the same reference signs in the various figures of the drawing. The description applies to all figures of the drawing in which the corresponding part can likewise be seen.

Figure 4:
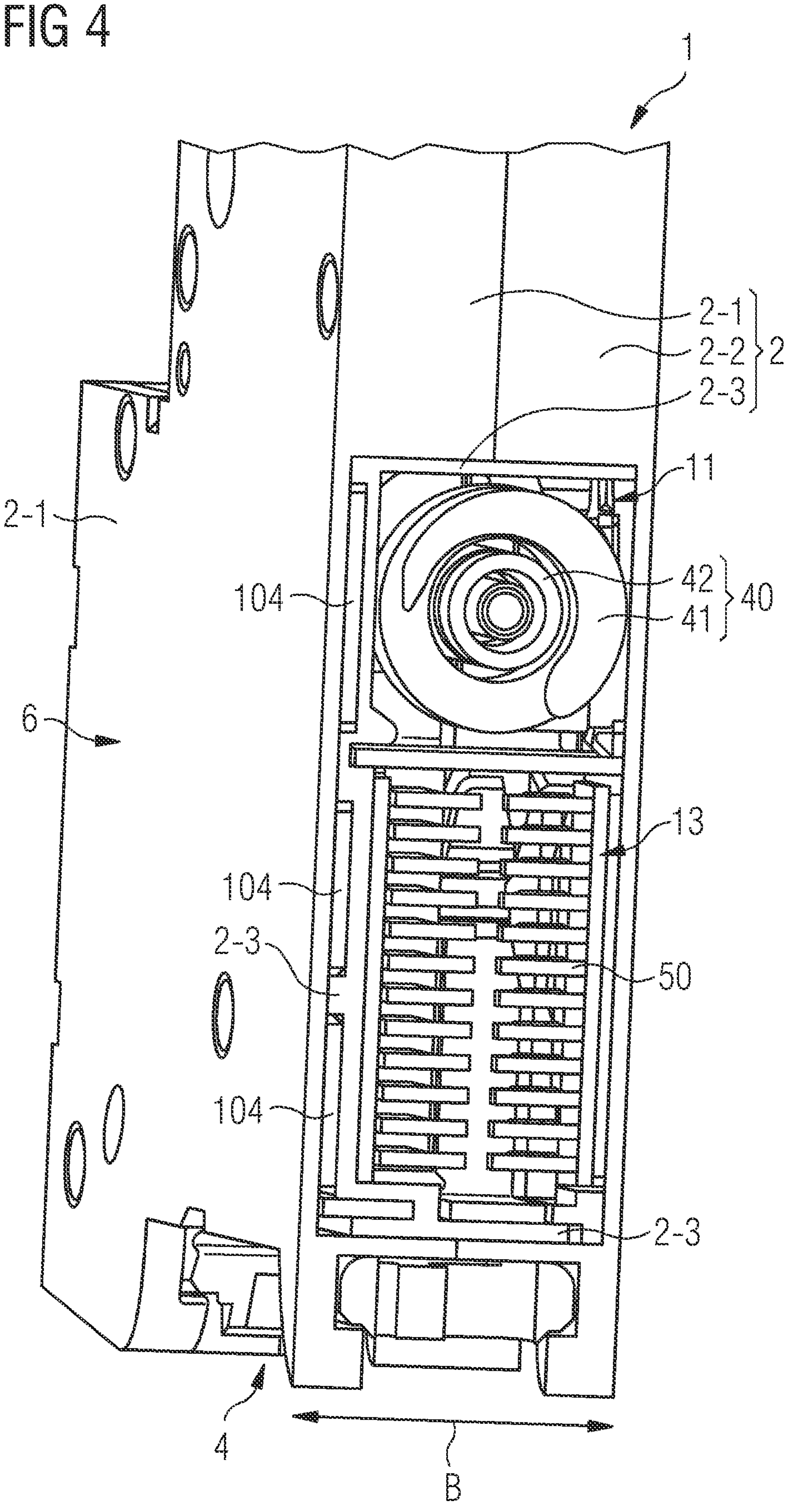
FIG. 4 shows a perspective sectional illustration of the compact circuit breaker according to the invention.

Schematically illustrated in a plurality of views in FIG. 1 is a first exemplary embodiment of the insulating-material housing 2 according to the invention for a compact circuit breaker 1 (see FIG. 4). The term "compact circuit breaker" herein is understood to be a circuit breaker device having two protected, electrically mutually isolated poles or switching points in a common housing with a width of only one pitch unit (1 pitch unit (TE) corresponds to approx. 18 mm). The two switching points here can be switchable conjointly or independently.

The insulating-material housing 2 according to the invention has a front side 3, a fastening side 4 which lies opposite the front side 3, as well as narrow sides 5 and wide sides 6 that connect the front side 3 to the fastening side 4. The front side 3 here is of a stepped configuration and therefore has a projecting central region as well as two recessed peripheral regions. A switching mechanism receptacle space 7, which serves for receiving and mounting a manually activatable switching mechanism of the compact circuit breaker 1, is configured in the interior of the projecting central region.

The interior of the insulating-material housing 2 furthermore has a first current path region 10 as well as a second current path region 20 which along a direction of longitudinal extent L extend from one of the two narrow sides 5 to the other, opposite narrow side 5, and are disposed next to one another in a width direction B. The first current path region 10 and the second current path region 20 here are disposed so as to be substantially mutually symmetrical with respect to a point in the insulating-material housing 2. The first current path region 10 here has a first receptacle space 11, a second receptacle space 12, as well as a third receptacle space 13; likewise, the second current path region 20 has a first receptacle space 21, a second receptacle space 22, as well as a third receptacle space 23. The first receptacle spaces 11, 21 serve for receiving and mounting in each case one short-circuit tripping device 40 (see FIG. 4) of the circuit breaker 1. The second receptacle spaces 12, 22 serve for receiving and mounting in each case one switching contact of the circuit breaker 1 and, if required, for receiving and mounting in each case one thermal actuator which in the event of a thermal overload acts on the switching mechanism of the compact circuit breaker 1 and in this manner causes the circuit breaker 1 to be triggered, i.e. causes the switching contact and/or contacts to be opened. The third receptacle spaces 13, 23 serve for receiving and mounting in each case one arc-quenching device 50 (see FIG. 4) of the compact circuit breaker 1.

Furthermore, the first current path region 10 has a first terminal receptacle space 18 for receiving and fixing in a stationary manner a first electrical terminal clamp, as well as a second terminal receptacle space 19 for receiving and fixing in a stationary manner a second electrical terminal clamp. Accordingly, the second current path region 20 has a first terminal receptacle space 28 for receiving and fixing in a stationary manner a first electrical terminal clamp, as well as a second terminal receptacle space 29 for receiving and fixing in a stationary manner a further second electrical terminal clamp. The compact circuit breaker 1 by way of the electrical terminal clamps (see FIGS. 5 and 6), which are disposed in the first and second terminal receptacle spaces 18, 19, 28 and 29 and are mounted so as to be fixed in the insulating-material housing 2, is able to be connected in an electrically conducting manner to electrical input and output connecting lines (not illustrated).

The first receptacle space 11 of the first current path region 10, as well as the first receptacle space 21 of the second current path region 20, here are configured in the region of in each case one of the two recessed peripheral regions of the front side 3 as well as in the region of in each case one of the two narrow sides 5 in the insulating-material housing 2. In other words: the first two receptacle spaces 11, 21 in the direction of longitudinal extent L are disposed behind one another in succession, wherein the first receptacle space 11 of the first current path region 10 is disposed in the region of the one narrow side 5, while the first receptacle space 21 of the second current path region 20 is disposed in the region of the other narrow side 5. Only two of the terminal receptacle spaces 18, 19, 28, 29 are in each case still disposed between the first receptacle spaces 11 and 21 and the respective narrow side 5.

The third receptacle space 13 of the first current path region 10, as well as the third receptacle space 23 of the second current path region 20, here are disposed between the fastening side 4 and the first receptacle space 11 or 21 assigned to the respective current path region 10 or 20, respectively. In other words: the third receptacle space 13 of the first current path region 10 is disposed between the fastening side 4 and the first receptacle space 11 of the first current path region 10, while the third receptacle space 23 of the second current path region 20 is disposed between the fastening side 4 and the first receptacle space 21 of the second current path region 20. When viewed orthogonally toward the front side 3, the two third receptacle spaces 13 and 23 are thus in each case disposed below the first receptacle space 11 or 21 assigned to the same current path region 10 or 20, respectively. Because the first current path region 10 and the second current path region 20 are disposed so as to be substantially symmetrical with respect to a point in the insulating-material housing 2, the switching contacts disposed in the respective second receptacle space are disposed in an opposing manner, i.e. the moving contacts thereof are activatable in an opposing manner, for example by the respective short-circuit tripping device or a thermal actuating device which is likewise disposed in the assigned second receptacle space.

As a result of this opposing disposal of the moving contacts, the central planes of the two short-circuit tripping devices 40 are in each case positioned so as to be spaced apart from the central plane of the compact circuit breaker 1. As a result of this eccentric disposal of the two short-circuit tripping devices 40, an additional installation space, i.e. the fourth receptacle space 104 or the further fourth receptacle space 204, is in each case created next to the first receptacle spaces 11 and 21 in the region of in each case one of the two wide sides 6, it being possible for said receptacle space 104 or 204 to be assigned so as to be hermetically sealed to the one or other current path region, or so as to be functionally openly assigned to the compact circuit breaker 1 as an entity.

The second receptacle space 12 of the first current path region 10 as well as the second receptacle space 22 of the second current path region 20 here are disposed so as to be mutually adjacent between the two first receptacle spaces 11 and 21 as well as centrically in the insulating-material housing 2. The two second receptacle spaces 12 and 22 here occupy in each case approximately half the installation space available in the width direction B in the interior of the insulating-material housing 2, while the two first receptacle spaces 11 and 21 as well as the two third receptacle spaces 13 and 23 occupy in each case significantly more than half of the available internal width of the insulating-material housing 2.

A fourth receptacle space 104, which is provided to receive an additional functional group of the circuit breaker 1, is configured in the width direction B next to the first receptacle space 11 and the third receptacle space 13 of the first current path region 10. The fourth receptacle space 104 here can be assigned to the first current path region 10 as well as to the second current path region 20. It is likewise possible that the fourth receptacle space 104 is assigned to both current path regions 10 and 20, for example because said fourth receptacle space 104 accommodates an additional functional group which may be assigned to both current path regions 10 and 20.

Furthermore, a further fourth receptacle space 204, which is provided to receive a further additional functional group of the circuit breaker 1, is configured in the width direction B next to the second receptacle space 21 and the third receptacle space 23 of the second current path region 20 in the interior of the insulating-material housing 2. The further fourth receptacle space 204 here can also be assigned to the first current path region 10 as well as to the second current path region 20. It is likewise possible that the further fourth receptacle space 204 is also assigned to both current path regions 10 and 20.

FIG. 1 shows the fundamental construction of the insulating-material housing 2 for disposing the individual components of a two-pole compact circuit breaker 1 at a housing width B of one pitch unit. This fundamental construction can however be scaled to circuit breakers having a plurality of protected poles, for example four protected poles in one insulating-material housing having a corresponding housing width of in this instance two pitch units.

Figure 2:
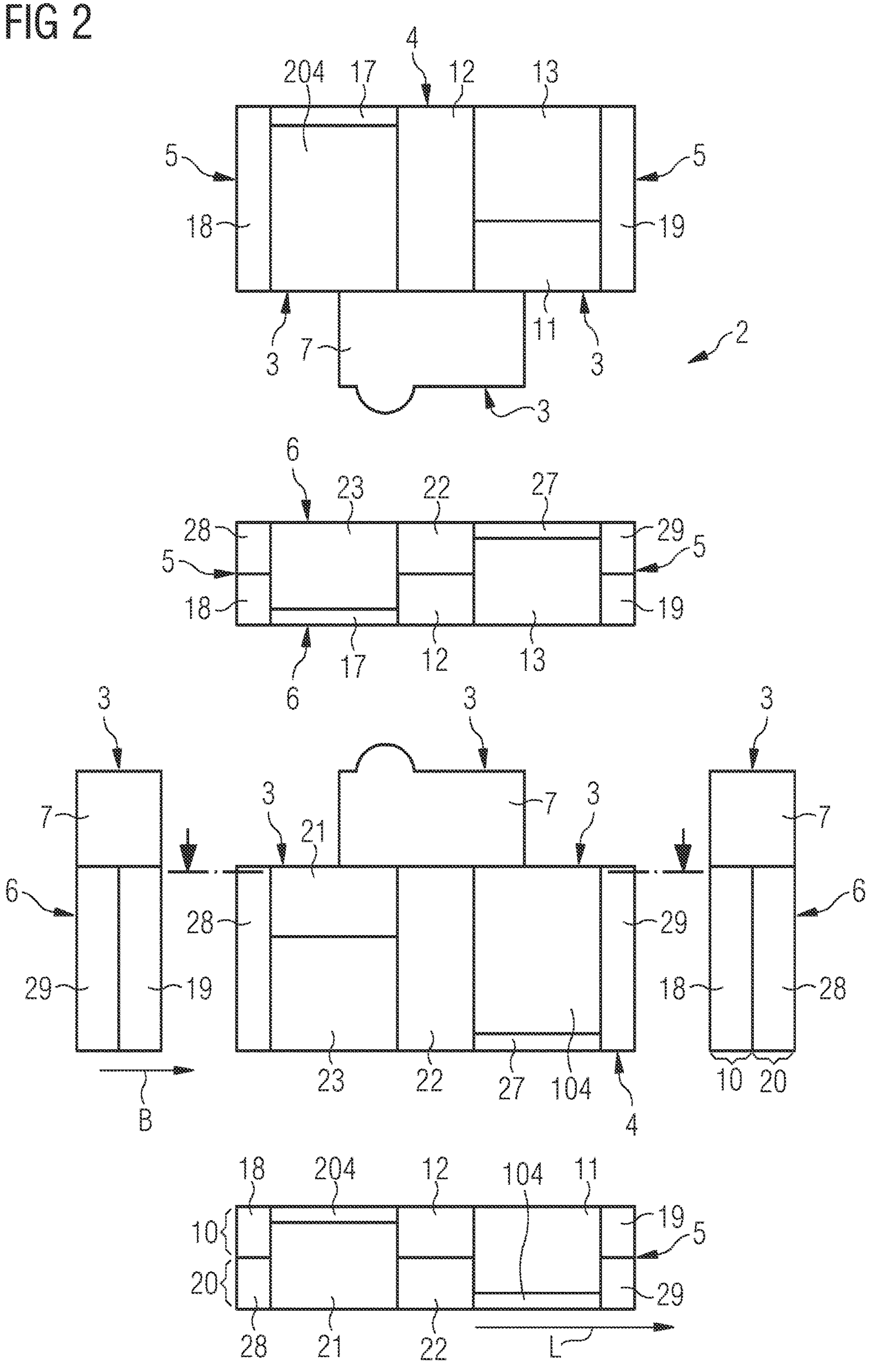
FIG. 2 shows a second exemplary embodiment of the insulating-material housing according to the invention.

Schematically illustrated in FIG. 2 is a second exemplary embodiment of the insulating-material housing 2 according to the invention, again in a plurality of views. As opposed to the first exemplary embodiment illustrated in FIG. 1, the fourth receptacle space 104 as well as the further fourth receptacle space 204 in the second exemplary embodiment do not extend quite up to the fastening side 4. Rather, a narrow connecting region 27 is disposed between the fastening side 4 and the fourth receptacle space 104, which connecting region 27 serves for receiving and mounting an electrically conducting connection between the second switching contact which is able to be disposed in the second receptacle space of the second current path region 20, and the electrical terminal clamp which is able to be disposed in the second terminal receptacle space 29 of the second current path region 20. Likewise, a further narrow connecting region 17 is disposed between the fastening side 4 and the further fourth receptacle space 204, which further narrow connecting region 17 serves for receiving and mounting a further electrically conducting connection between the first switching contact which is able to be disposed in the second receptacle space 12 of the first current path region 20, and the further second electrical terminal clamp which is able to be disposed in the second terminal receptacle space 19 of the first current path region 10. The electrically conducting connections between the first switching contact and/or the second switching contact and the electrical terminal clamp which is in each case unequivocally assigned to the respective switching contact can be of different design, for example as a rigid conductor, as a flexible wire, as a sheet-metal strip, or the like.

Figure 3:
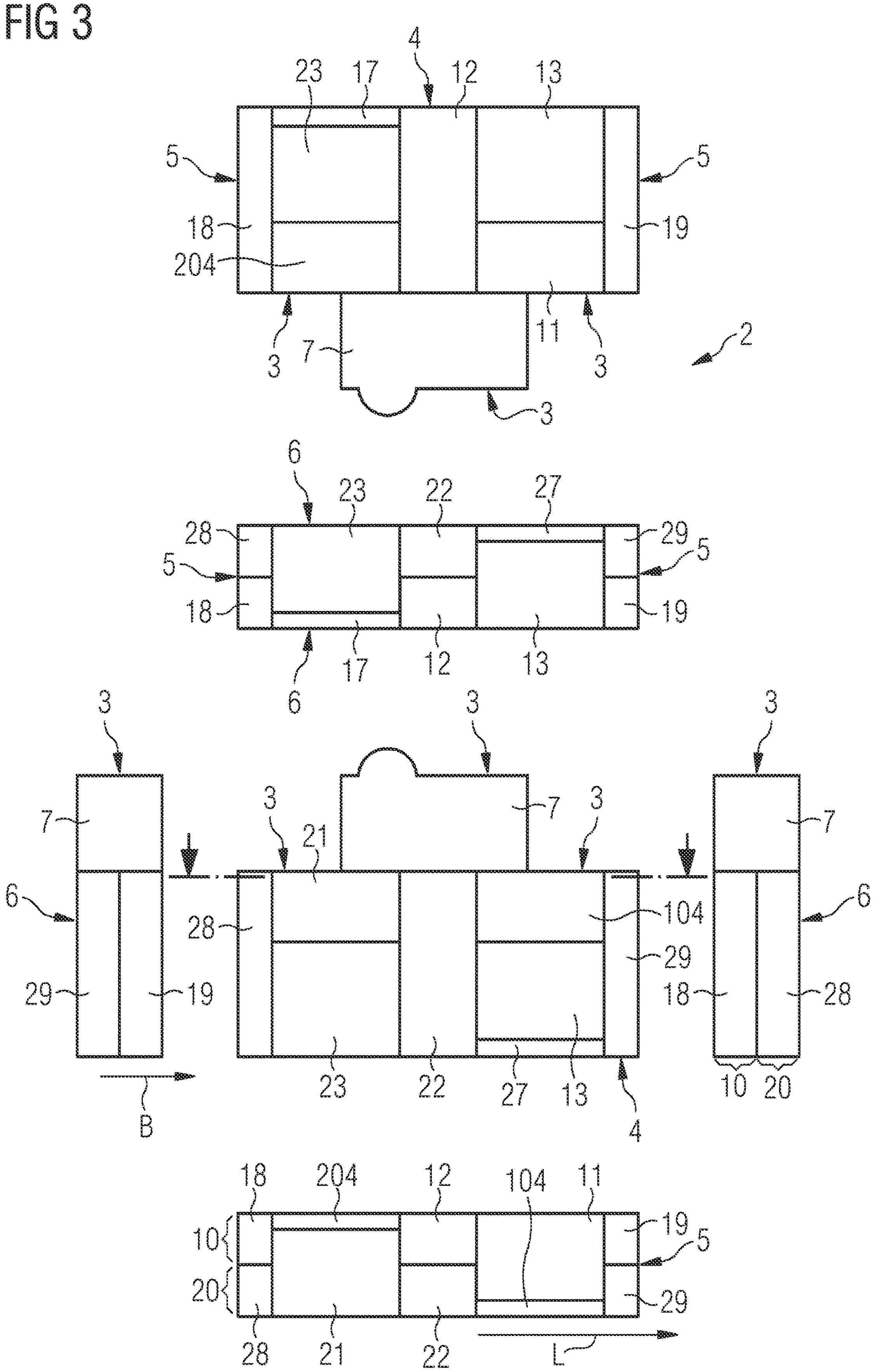
FIG. 3 shows a third exemplary embodiment of the insulating-material housing according to the invention.

Schematically illustrated in FIG. 3 is a third exemplary embodiment of the insulating-material housing 2 according to the invention, again in a plurality of views. The fourth receptacle space 104 here is now disposed only in the region next to the first receptacle space 11 of the first current path region 10. Likewise, the further fourth receptacle space 204 is now only disposed next to the first receptacle space of the second current path region 20. This embodiment is expedient, for example, when the additional functional group to be disposed in the fourth receptacle space 104 is to be assigned directly to the short-circuit tripping device that is to be disposed in the first receptacle space 11 of the first current path region 10, as well as the additional functional group to be disposed in the further fourth receptacle space 204 is to be assigned directly to the short-circuit tripping device that is to be disposed in the first receptacle space 21 of the second current path region 20, for example in the form of a respective shielding plate so as to reduce the magnetic field generated by the respective short-circuit tripping device.

The advantage that the third receptacle spaces 13 and 23 can be designed correspondingly larger, i.e. wider, can furthermore be derived from the housing apportionment illustrated in FIG. 3, so that the arc-quenching devices which are to be disposed in the third receptacle space 13 and those to be disposed in the further third receptacle space 23 can likewise be of a larger embodiment.

FIG. 4 schematically shows a perspective sectional illustration of the compact circuit breaker 1 according to the invention, wherein the section plane runs parallel to the narrow sides 5 through the first receptacle space 11 as well as the third receptacle space 13 of the first current path region 10. The insulating-material housing 2 presently is configured in three parts and has a first housing cover 2-1 as well as a second housing cover 2-2, which are fastened to a housing central part 2-3, for example by means of rivet and/or latching connections.

A short-circuit tripping device 40 of the compact circuit breaker 1 is disposed, i.e. received and mounted, in the first receptacle space 11. The short-circuit tripping device 40 has a solenoid 41 as well as an armature/tappet module 42 which is movable relative to the latter and, when a short-circuit current arises, moves through the magnetic field generated by the solenoid 41 in the direction of the switching contact assigned to the first current path region 10, so as to open the switching contact and in this manner interrupt the current flow.

An arc-quenching device 50 of the compact circuit breaker 1 is disposed, i.e. received and mounted, in the third receptacle space 13, below the short-circuit tripping device 40. The arc-quenching device 50 has a multiplicity of quenching plates which are disposed so as to be mutually parallel and spaced apart. When the arc hits the arc-quenching device 50, the arc is divided into a plurality of sub-arcs which burn electrically in series between the individual quenching plates. Owing to the higher arc voltage resulting therefrom, and to the cooling effect of the quenching plates, the arc is ultimately quenched.

The fourth receptacle space 104, in which the additional functional group of the circuit breaker 1 can be disposed, is situated in the width direction B next to the first receptacle space 11 having the short-circuit tripping device 40 disposed therein, and next to the third receptacle space 13 having the arc-quenching device 50 disposed therein. The width direction B herein corresponds to the normal direction of the wide sides 6.

Figure 5:
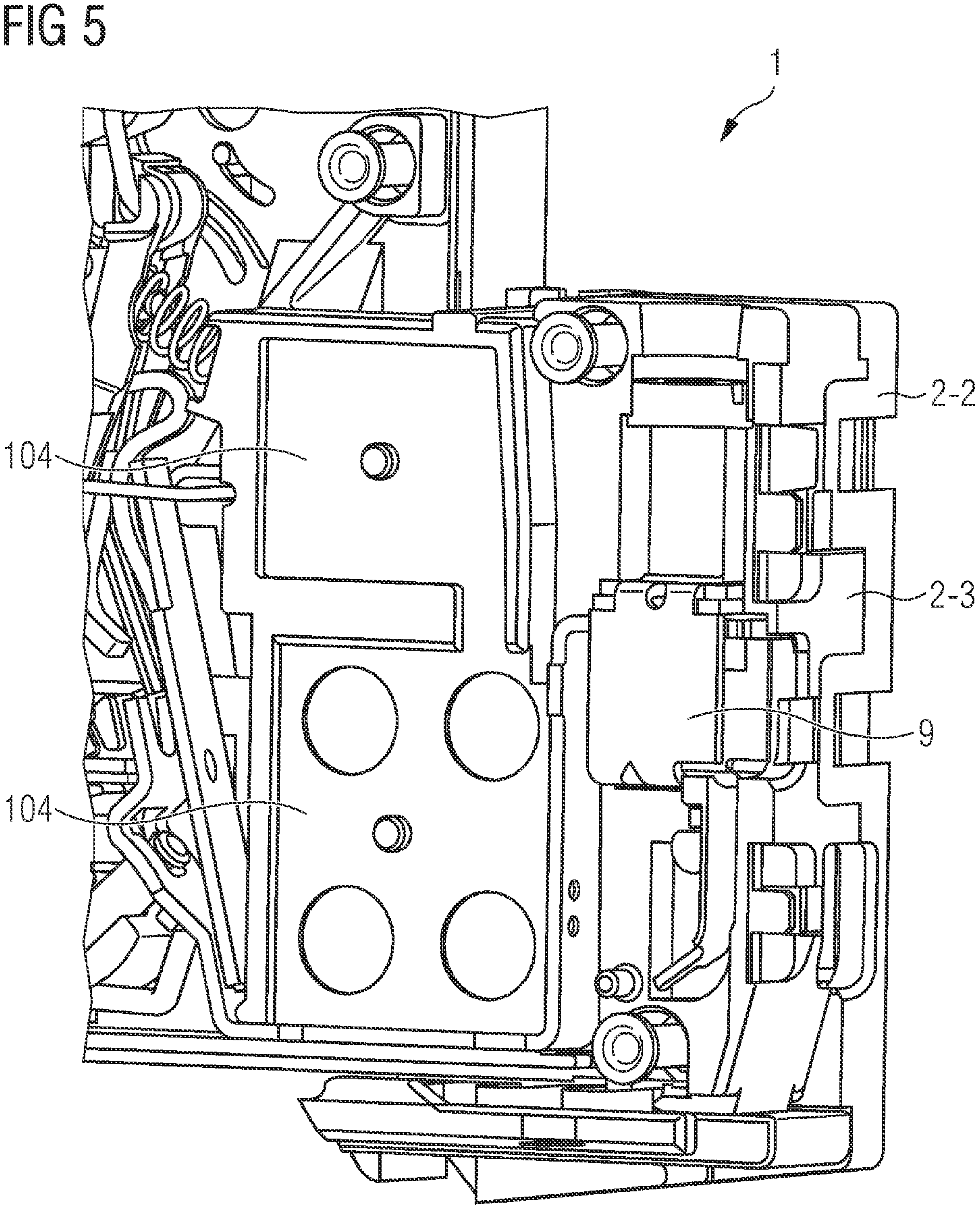
FIGS. 5 and 6 show perspective lateral illustrations of the compact circuit breaker according to the invention.
Figure 6:
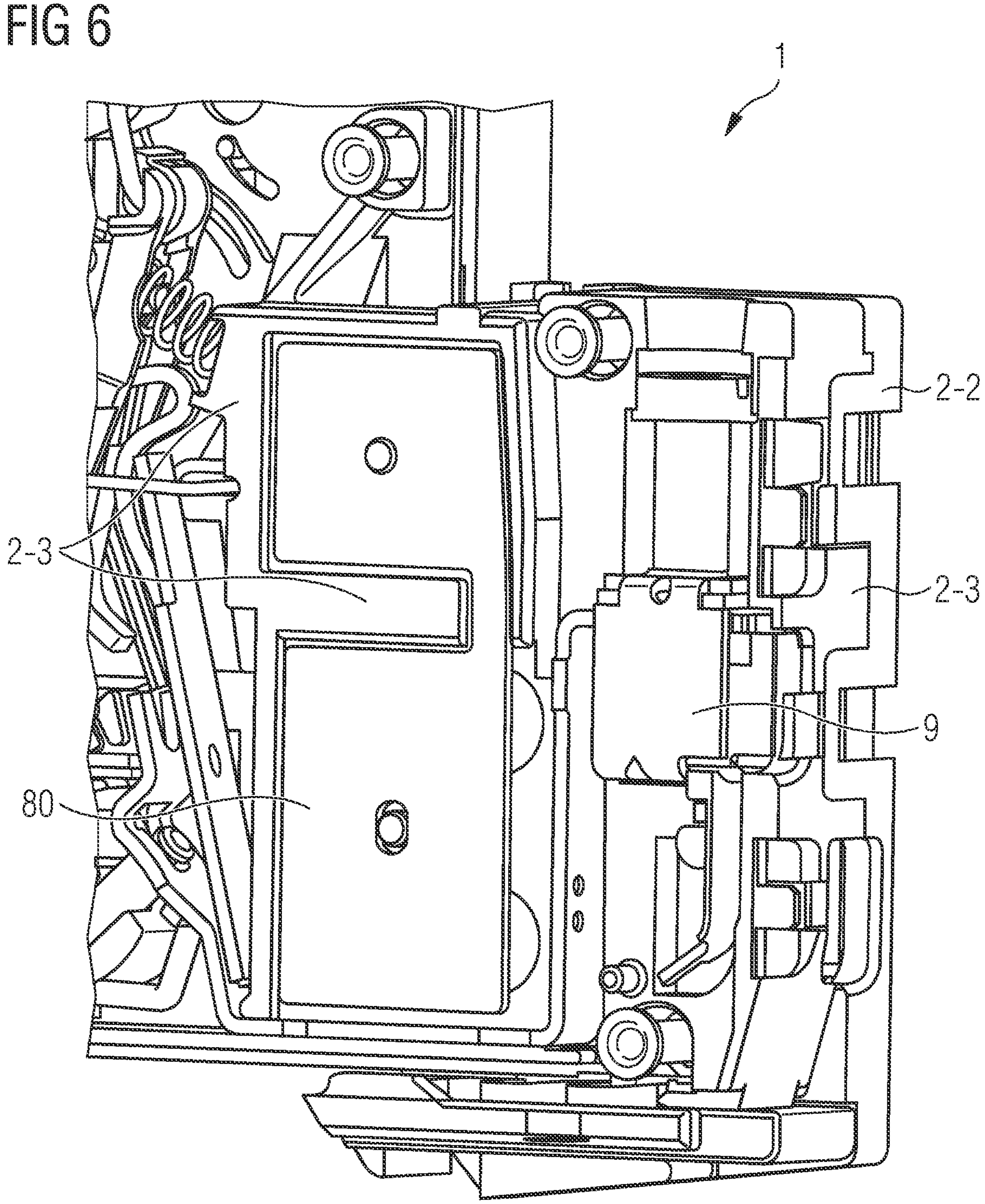

FIGS. 5 and 6 show perspective lateral illustrations of the compact circuit breaker 1 according to the invention, wherein the housing cover 2-1 has been omitted so as to enable a view onto the fourth receptacle space 104. By way of example, a cooling element 80 for a potential additional functional group to be disposed in the fourth receptacle space 104 is received and mounted in the latter. Furthermore to be seen in this illustration, between the cooling element 80 and the narrow side 5, is the terminal clamp 9 disposed in the terminal receptacle space 29. The terminal clamp 9 in this illustration is embodied as a screw clamp; however, this is not relevant to the invention which is why other suitable terminal elements can also be used there.

With the aid of the fourth receptacle space 104 and/or the further fourth receptacle space 204 it is possible to upgrade the functionality of the compact circuit breaker by one or a plurality of functions. In particular in the case of compact circuit breaker devices having two secured poles at a width of one pitch unit or four secured poles at a width of two pitch units, the possibility to implement additional functions represents a not insignificant competitive advantage. The following possibilities can be considered, for example, as an additional functional group, or as a further additional functional group which can be received and mounted in the fourth receptacle space 104 and/or in the further fourth receptacle space 204:

- Using one or a plurality of shielding plates in relation to exiting magnetic fields of the short-circuit tripping device disposed in the adjacent first receptacle space 11 or 21, respectively, so as to influence or minimize the magnetic influence on adjacent circuit breaker devices.
- Incorporating ferromagnetic materials so as to influence the effect of the arc in the region of the arc-quenching device disposed in the adjacent third receptacle space 13 or 23, respectively.
- Incorporating cooling elements 80 made from ferromagnetic or non-ferromagnetic, solid, liquid or gaseous materials for cooling the short-circuit tripping device 40 disposed in the adjacent first receptacle space 11 or 21, respectively, and/or the arc-quenching device 50 disposed in the adjacent third receptacle space 13 or 23, respectively.
- Utilizing the construction volume provided by the fourth receptacle space 104 and/or in the further fourth receptacle space 204 for influencing the gas exchange, in particular in the region of the respective switching contact disposed in the respective second receptacle space 12 or 22, respectively: this includes, for example, suitable streamlined contours for guiding the gas stream in a targeted manner while shutting down/quenching an arc.
- Using electronic components which serve for digitizing the compact circuit breaker 1, for example by way of a communications module (wired or wireless), a measuring device, for example for detecting the type of tripping (thermal or magnetic), a counting function, temperature monitoring, a failure probability prognosis, etc.
- Owing to the physical proximity of the short-circuit tripping device disposed in the adjacent first receptacle space 11 or 21, respectively, as well as of the arc-quenching device 50 disposed in the adjacent third receptacle space 13 or 23, respectively, electronic actuators and/or sensors for monitoring the state and transmitting the state can advantageously be incorporated in the fourth receptacle space 104 and/or the further fourth receptacle space 204.
- Instead of the connecting region 17 or 27, respectively, the fourth receptacle space 104 and/or the further fourth receptacle space 204 can also be utilized as an alternative connecting region between the output-side terminal clamp 9 and the switching contact disposed in the second receptacle space 21 or 22, respectively, optionally by way of the thermal system which is likewise disposed in the second receptacle space 21 or 22, respectively.
- Furthermore, the construction volume made available by the fourth receptacle space 104 and/or the further fourth receptacle space 204 can also be utilized as an additional exhaust duct, so as to positively influence the gas exchange in the compact circuit breaker 1, here in particular in the region of the arc-quenching device 50.

LIST OF REFERENCE SIGNS

1 Compact circuit breaker
2 Insulating-material housing
  2-1 Housing cover
  2-2 Housing cover
  2-3 Housing central part
3 Front side
4 Fastening side
5 Narrow side
6 Wide side
7 Switching mechanism receptacle space
9 Terminal
10 Current path region
11 First receptacle space
12 Second receptacle space
13 Third receptacle space
17 Connecting region
18 First terminal receptacle space
19 Second terminal receptacle space
20 Current path region
21 First receptacle space
22 Second receptacle space
23 Third receptacle space
27 Connecting region
28 First terminal receptacle space
29 Second terminal receptacle space
40 Short-circuit tripping apparatus
41 Solenoid
42 Armature/tappet module
50 Arc-quenching device
80 Cooling element
104 Fourth receptacle space
204 Further fourth receptacle space
B Width direction
L Direction of longitudinal extent

The invention claimed is:

1. A compact circuit breaker, comprising:

an insulating-material housing having:
- a front side, a fastening side opposite said front side, and narrow and wide sides connected between said front side and said fastening side;
- first and second current path regions disposed next to one another in a width direction and configured to each receive a current path, with each of said current path regions having:
  - a first receptacle space configured to receive a short-circuit tripping device of the circuit breaker;

a second receptacle space configured to receive a switching contact of the circuit breaker;

a third receptacle space configured to receive an arc-quenching device of the circuit breaker;

said two first receptacle spaces being disposed in said insulating-material housing in a region of said front side and in a region of a respective one of said narrow sides;

said two second receptacle spaces being disposed in said insulating-material housing centrally between said two first receptacle spaces;

said third receptacle spaces each being disposed between said fastening side and the respectively assigned said first receptacle space of the respective said current path region;

a fourth receptacle space configured to receive an additional functional group of the circuit breaker;

said fourth receptacle space being disposed, in a normal direction of said wide sides, next to said first and/or third receptacle spaces of said first current path region;

a first current path in said first current path region that is interruptible by a first switching contact disposed in said second receptacle space of said first current path region;

a second current path in said second current path region that is interruptible by a second switching contact disposed in said second receptacle space of said second current path region;

a first short-circuit tripping apparatus disposed in said first receptacle space of said first current path region, and a second short-circuit tripping apparatus disposed in said first receptacle space of said second current path region;

a first arc-quenching device disposed in said third receptacle space of said first current path region, and a second arc-quenching device disposed in said third receptacle space of said second current path region; and an additional functional group disposed in said fourth receptacle space.

2. The compact circuit breaker according to claim 1, wherein said first switching contact and said second switching contact are disposed in an opposing manner and are activatable in an opposing manner.

3. The compact circuit breaker according to claim 1, wherein said additional functional group is assigned to the first current path region or to the second current path region.

4. The compact circuit breaker according to claim 1, which comprises a further additional functional group disposed in a further fourth receptacle space.

5. The compact circuit breaker according to claim 1, which comprises a further fourth receptacle space configured to receive a further additional functional group of the circuit breaker, said further fourth receptacle space being disposed, in the normal direction of said wide sides, next to said first and/or third receptacle spaces of said second current path region.

6. The compact circuit breaker according to claim 5, wherein at least one of said fourth receptacle space or said further fourth receptacle space extends at least partially from a region next to said first receptacle space to an adjacent region next to said third receptacle space.

7. The compact circuit breaker according to claim 5, wherein said fourth receptacle space is disposed next to said first receptacle space of said first current path region and said further fourth receptacle space is disposed next to said first receptacle space of said second current path region.

8. The compact circuit breaker according to claim 5, wherein said further fourth receptacle space assigned to said second current path region is disposed next to said first receptacle space of said first current path region.

9. The compact circuit breaker according to claim 1, wherein said fourth receptacle space assigned to said first current path region is disposed next to said first receptacle space of said second current path region.

* * * * *